US006697969B1

(12) United States Patent
Merriam

(10) Patent No.: US 6,697,969 B1
(45) Date of Patent: Feb. 24, 2004

(54) METHOD, SYSTEM, AND PROGRAM FOR DIAGNOSING A COMPUTER IN A NETWORK SYSTEM

(75) Inventor: Greg Elliot Merriam, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,139

(22) Filed: Sep. 1, 1999

(51) Int. Cl.$^7$ ............................................... G06F 11/00
(52) U.S. Cl. ............................ 714/46; 709/224; 714/25
(58) Field of Search .......................... 714/25, 37, 43, 714/46, 47, 27; 709/224

(56) References Cited

U.S. PATENT DOCUMENTS

| | | | |
|---|---|---|---|
| 5,727,129 A | | 3/1998 | Barrett et al. ................. 395/12 |
| 5,870,557 A | * | 2/1999 | Bellovin et al. ............ 709/224 |
| 5,870,769 A | | 2/1999 | Freund ....................... 707/501 |
| 6,006,260 A | * | 12/1999 | Barrick, Jr. et al. ......... 709/224 |
| 6,065,136 A | * | 5/2000 | Kuwabara ..................... 714/31 |
| 6,269,401 B1 | * | 7/2001 | Fletcher et al. ............. 709/224 |
| 6,317,788 B1 | * | 11/2001 | Richardson .................. 709/224 |
| 2001/0010059 A1 | * | 7/2001 | Burman et al. ............. 709/224 |

OTHER PUBLICATIONS

J.M. Almeida, et al., "WebMonitor: a Tool for Measuring World–Wide Web Server Performance", 1997, firstmonday, pp. 1–22.

"Luminate Sheds Light on R/3", Dec. 12, 1998, PC Week, vol. 15, Issue 51, pp. 1–2.

D. Hafke, "CRN Test Center Exclusive –Bay Networks' Intuitive Web PocketProbe Analyzes Bandwidth Use to Maintain Network Health, Uptime", Jul. 27, 1998, Computer Reseller News 800, pp. 1–4.

"Latest Network Management Products", Sep. 1, 1998, Communication News, vol. 35, pp. 1–7.

R. Lee, et al., "Charlotte: An Automated Tool for Measuring Internet Response Time", 1999, Novell, pp. 1–22.

* cited by examiner

*Primary Examiner*—Robert Beausoliel
*Assistant Examiner*—Marc M Duncan
(74) *Attorney, Agent, or Firm*—David W. Victor; Konrad Raynes Victor & Mann, LLP

(57) ABSTRACT

Disclosed is a method, system, and program for diagnosing a computer over a network, such as the Internet. A program, such as an applet, is provided that executes on the computer. The program causes the computer to download at least one object from a server over the network. Performance data is determined with respect to downloading the object from the server to the computer over the network in order to diagnose performance problems with the computer. The determined performance data is then transmitted to a diagnostic system over the network.

21 Claims, 5 Drawing Sheets

METHOD, SYSTEM, AND PROGRAM FOR DIAGNOSING A COMPUTER IN A NETWORK SYSTEM

BACKGROUND OF THE INVENTION

1. Field of the Invention

The present invention relates to a method, system and program for diagnosing a computer in a network system and, in particular, gathering network and application performance data to use in diagnosing the computer.

2. Description of the Related Art

Many businesses that sell computer related services and products transact with customers over the Internet, i.e., World Wide Web, or Intranet. One problem with transacting business over the Internet is the delays customers experience to execute transactions to access information. Lengthy delays may frustrate customers and cause them to associate access delays and problems with the business with which they are transacting, even if the business is not at fault for the delays. Many computer related businesses provide technical support to help customers diagnose their computer problems. Providing support technicians to assist customers with computer problems can be a very expensive service because of the labor intensive nature of the technical support function. One of the major determining factors in the effectiveness of live technical support is the ability of the technician to adequately diagnose the problem in a timely manner. Diagnosing problems may depend to some extent on the customer, whose lack of knowledge may hinder the diagnostic process. Any factors that hinder and delay the ability of the technician to diagnoses the problem will increase the businesses technical support costs and further frustrate the customer.

When a technician speaks with a customer over the phone to diagnose the computer problem, the technician may request the customer to perform certain tasks on the computer to assist with the diagnosis. Involving the customer to perform the diagnosis could complicate and delay the diagnostic process if the customer has limited technical knowledge of the computer and needs significant time to perform the requested operations. When information is obtained verbally from a customer, the accuracy of the information is "only as good as" the technical knowledge of the end-user. Moreover, the customer may not perform the operations correctly or lack the technical knowledge to execute the operations requested by the technician. Still further on-line assistance where the customer self-diagnoses problems can also lead to frustration if the customers do not perform the self-diagnosis properly and fix the problem. All these factors can significantly lengthen the diagnostic process, increase the cost of the diagnostic process, increase the inaccuracy of diagnosis, and further erode customer confidence.

For these reasons, there is a need in the art to provide improved systems for diagnosing computer related problems when providing technical support.

SUMMARY OF THE PREFERRED EMBODIMENTS

To overcome the limitations in the prior art described above, preferred embodiments disclose a method, system, and program for diagnosing a computer over a network. A program is provided that executes on the computer. The program causes the computer to download at least one object from a server over the network. Performance data is determined with respect to downloading the object from the server to the computer over the network in order to diagnose performance problems with the computer. The determined performance data is then transmitted to a diagnostic system over the network.

In further embodiments, the process of determining the performance data comprises determining a sever and network transmission time to download the object from the server and a display time to execute the object within the computer and display content of the object at the computer.

In still further embodiments, the diagnostic system displays the performance data transmitted from the computer being diagnosed and average performance data determined from a database of previously gathered performance data to provide information to diagnose the computer.

Preferred embodiments provide a program to monitor network transmissions at a computer, such as a customer's computer, for the purpose of gathering performance data. The program or applet executing in the customer computer transmits the gathered performance data to a diagnostic system. In preferred embodiments, the applet will further analyze the data and perform calculations on the data, such that the data transmitted to the diagnostic system is a complete report. Previously, reliance on the customer to perform diagnostic actions would result in significant delays to determine the source of the problem because the customer often lacks the computer technical knowledge to quickly perform the requested diagnostic action or may incorrectly execute the operation, which would require the technician to determine that customer mistakes occurred and request the customer to again perform the diagnostic operation. Further, reliance on customers to diagnose the system may result in inaccuracy of the findings.

Once the performance data is gathered, it can be immediately presented to both the customer on a customer display and a technician operating the diagnostic system from the database. In this way, diagnostic information is automatically gathered and provided to the technician without having to rely on the technical acumen of the customer. The technician would then use the diagnostic information to determine the source of the problem the customer is experiencing. Further, preferred embodiments would allow the customer to execute the applet program on the computer to self-diagnose of the problem without the assistance of a support technician. The performance data would still be uploaded to the help desk to store in the database for future use. An Internet web site may provide solutions to known problems for the customer to attempt after self-diagnosing the problem.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
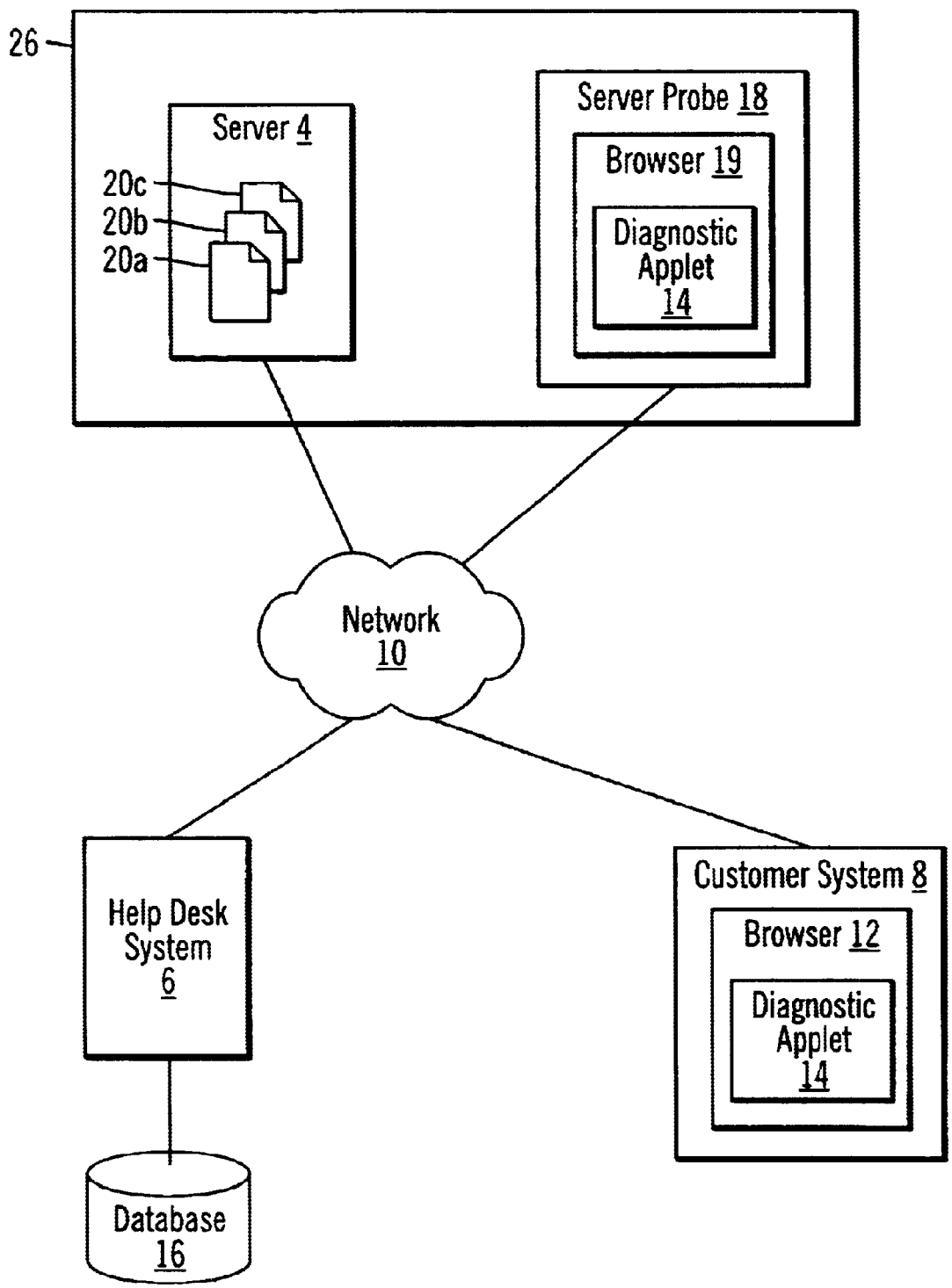
FIG. 1 illustrates a computing environment in which preferred embodiments of the present invention are implemented.

FIG. 1 illustrates a hardware and software environment in which preferred embodiments are implemented. A computing environment 2 comprises a server 4, a help desk system 6, a customer system 8, and a network 10 providing communication therebetween. The server 4 may be any server device known in the art capable of servicing network requests, e.g., IBM NETFINITY®, AS/400®, and RS/6000®; and POWEREDGE® from Dell Computer Corporation.** In preferred embodiments, the server 4 would include Hypertext Transfer Protocol (HTTP) software to service HTTP requests from the customer system 8. The server 6 and help desk system 6 may also include software to handle document requests in data transfer protocols other than HTTP, such FTP, Gopher, WAIS, NNTP, SMTP, etc.

The customer system 8 is any computer system used by a customer or other end user of a computer related product or service, which may comprise a personal computer, server, laptop, etc. The customer system 8 includes a browser program 12 that can submit document requests to the server 4. In preferred embodiments, the browser program 12 is a Hypertext Markup-Language (HTML) browser, e.g., NETSCAPE Communicator, the MICROSOFT Internet Explorer, Spry Mosaic, NCSA Mosaic, Lynx, Opera, GNUscape Navigator, etc., that include HTTP software to function as HTTP clients capable of transferring requests for documents to the server 4. The HTTP server protocol is described in "Hypertext Transfer Protocol—HTTP/1.1," Network Working Group, Request for Comments No. 2068 (January, 1997), which publication is incorporated herein by reference in its entirety. The browser program 12 may also include plug-ins or additional program features to process files in other media formats, such as sound files, movie files, JAVA applets, etc.

**NETSCAPE is a registered trademark of the Netscape Communications Corporation; WINDOWS and MICROSOFT are registered trademarks of Microsoft Corporation; OS/2, NETFINITY, AS/400, and RS/6000 are registered trademarks of International Business Machines Corporation; UNIX is a registered trademark licensed by the X/Open Company LTD; INTEL and PENTIUM are registered trademarks of Intel Corporation; JAVA is a trademark of Sun Microsystems, Inc; POWEREDGE is a registered trademark of the Dell Computer Corporation.

In preferred embodiments, a diagnostic applet 14, which the customer system 8 downloads from the help desk system 6 over the network by issuing an HTTP GET request, executes within the customer system 8. In preferred embodiments, the diagnostic applet 14 comprises a Java program applet and the browser 12 includes code to function as a Java Virtual Machine. In this way, the browser 12 can download the diagnostic applet 14 from the help desk system 6 and execute the Java applet 14 within the browser 12.

The help desk system 6 may comprise any known computer system. The help desk system 6 may access a database 16 that stores performance data gathered for all the customer systems 8 in the network 10. The help desk system 6 would include a database management program to access, query, and analyze the customer data in the database 16.

The network 10 may be a TCP/IP network, such as the Internet and World Wide Web, or any other network system known in the art, e.g., LAN, Ethernet, WAN, System Area Network (SAN), Token Ring, LocalTalk, TCP/IP, the Internet, etc. Alternatively, there may be separate and different networks between the server 4, help desk system 6, and customer system 8.

The server 4 further includes a storage area, e.g., hard disk drive, tape drive, cache, etc., objects 20a, b, c, to maintain files intended for transmittal over the network 10. The objects 20a, b, c may comprise any text or media data known in the art, such as HTML files, text, graphical images, sound files, movies, Java applets, etc. These objects 20a, b, c are intended for transmittal to the customer system 8 to measure the customer 8 response and performance time. Further, certain objects 20a, b, c may be embedded in other objects. For instance, one object may be an HTML page that has an embedded object, such as a frame, image, sound file, etc., that displays within the HTML object.

A server probe 18 comprises a system similar to the customer systems 8, including a browser 19 typical of the browser 12 at the customer systems 8 and the same diagnostic applet 14 used at the customer systems 8. In preferred embodiments, the server probe 18 and server 4 are in the same geographical location 26, e.g., the same building, room, city, plant site, etc. Preferably the server probe 18 is located within only one hop, i.e., router, of the server 4 in the network 10.

In preferred embodiments, the server probe 18 is comprised of a typical customer computer system, such as a personal computer processor and operating system, e.g., as an INTEL PENTIUM processor at a speed that is commonly used, a common operating system, such as Microsoft WINDOWS®, OS/2®, etc., and a common browser 12, e.g., Netscape, etc. For instance, if the customers are mostly individual home computer users, then an Intel Pentium type machine with Microsoft Windows may be used to implement the server probe 18. However, if the customers are more "high-end" users running UNIX based products, then the server probe 18 would be implemented in hardware and software typically used by UNIX users. Further, the probe 18 would include the same diagnostic applet 14 and similar browser 12 as those used in customer systems 8.

**NETSCAPE is a registered trademark of the Netscape Communications Corporation; WINDOWS and MICROSOFT are registered trademarks of Microsoft Corporation; OS/2, NETFINITY, AS/400, and RS/6000 are registered trademarks of International Business Machines Corporation; UNIX is a registered trademark licensed by the X/Open Company LTD; INTEL and PENTIUM are registered trademarks of Intel Corporation; JAVA is a trademark of Sun Microsystems, Inc; POWEREDGE is a registered trademark of the Dell Computer Corporation.

The primary function of the server probe 18 is to measure network performance with respect to the server 4 that is not subject to distance factors. In other words, the network transmission time for the server probe 18 reflects primarily server delay time or the time for the server 4 to process and return the request. Server delay time may be affected by the current load of the server, size of the requested file, whether the request requires a search and retrieval of data from a database, etc. To best determine the server delay component of network transmission time, the server probe 18 would include a communication device typical of the customer systems 8. Alternatively, the server probe 18 may include multiple communication devices to determine the transmission time with the server 4 using different communication devices, e.g., phone line modems, cable modems, DSL, T1, etc. If all communication factors for the server probe 18 and customer system 8 are similar except for the distance, then the difference in network transmission or download times between the server probe 18 and customer system 8 would reflect delay time due to the distance between the customer system 8 and the server 4. Increasing the distance of the server 4 and customer system 8 results in a greater number of routes and hops transmitted packets must travel.

Gathering Performance Measurement Data to Diagnose Problems

Preferred embodiments provide customers at computers 8 with the diagnostic applet 14 to execute. If a customer has a technical problem accessing data from the server 4, the customer may call a technician operating a help desk system 6. During the call, the technician would have the customer automatically download the diagnostic applet 14, which would include Universal Resource Locator (URL) addresses of objects for the customer system 8 to access for testing purposes. The customer could proceed to a web page, click-on an icon, which would then cause the diagnostic applet 14 to download and execute on the customer 8 machine. The diagnostic applet 14 is capable of opening numerous application programs on the client, such as Lotus Notes, Internet Explorer, Netscape, etc., and operating the customer system's 8 graphical user interface (GUI) to perform operations. In this way, the diagnostic applet 14 can emulate user behavior. The co-pending and commonly assigned patent application, entitled "System, Method, and Program for Measuring Performance in a Network System," having U.S. Ser. No. 09/310,502 and filed on May 12, 1999, which patent application is incorporated herein by reference in its entirety, describes a program for gathering performance data from remote systems.

Figure 2:
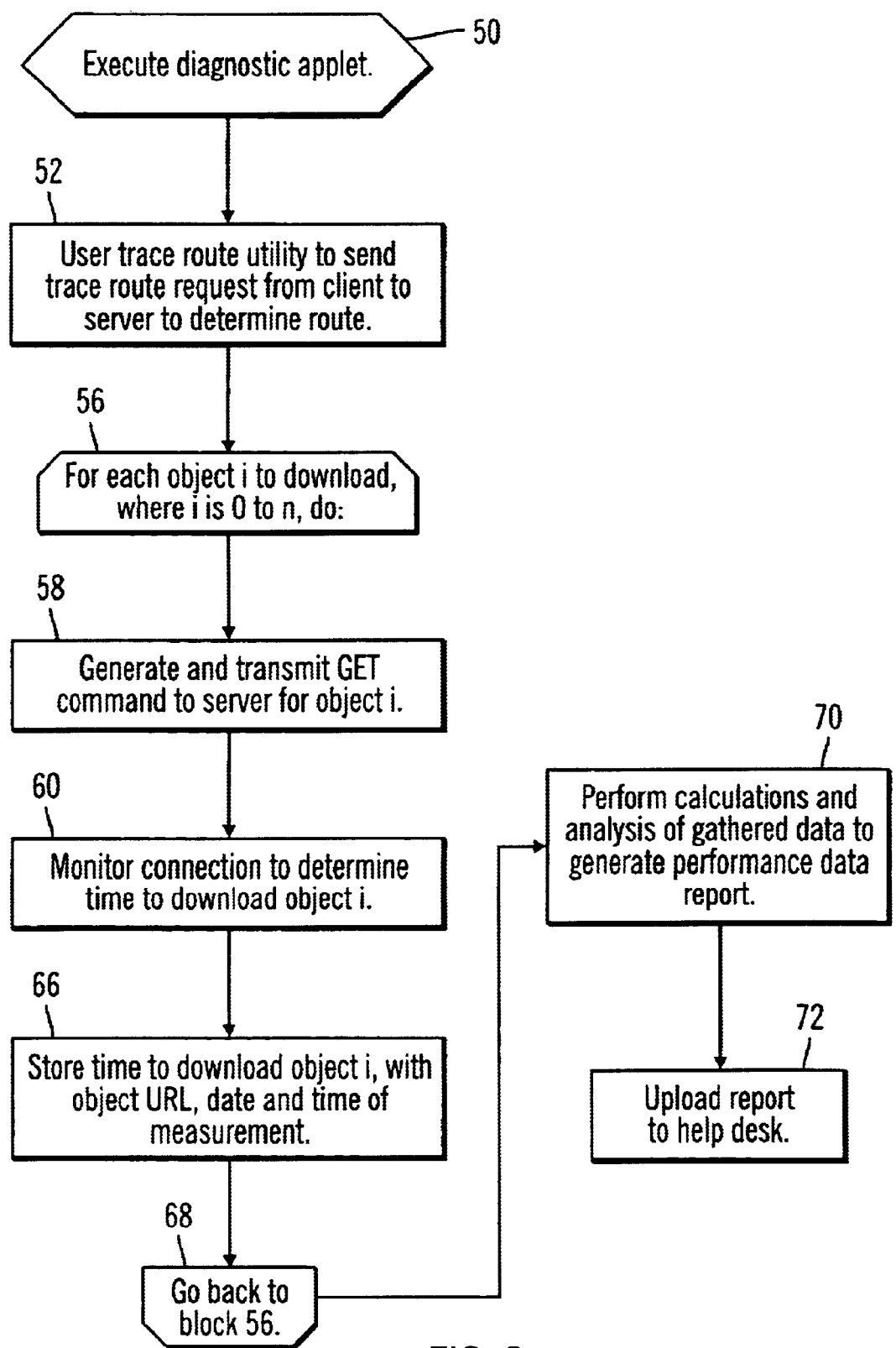
FIG. 2 illustrates logic to gather customer performance data in accordance with preferred embodiments of the present invention.

FIG. 2 illustrates logic implemented in the diagnostic applet 14 to perform diagnostic operations on the customer system 8. The diagnostic applet 14 is capable of gathering performance data on the time to download objects 20a, b, c from the server 4. Control begins at block 50 with the browser 12 executing the diagnostic applet 14 downloaded from the help desk system 6 to perform diagnosis of network and system operations. The diagnostic applet 14 then executes (at block 52) a trace route utility known in the art to transmit a packet from the customer system 8 to the server 4 to determine how many hops the packet requires to reach the server 4 and how long each hop takes. A hop is an instance of a packet being forwarded to a next router. The results from the trace rout request may be piped to a file maintained by the diagnostic applet 14 to include in the performance data report sent to the help desk 6. Using a trace route utility known in the art would allow the technician to determine whether any particular hops are the cause of any delays. At block 56, the diagnostic applet 14 begins a loop to download n objects from the server 4. These objects may include HTML pages, text, graphic images, sound files, motion picture files, etc.

For each object i, the diagnostic applet 14 generates and transmits (at block 58) an HTTP GET command to the server 4 requesting the object i. A particular request for an object may be for an object 20a, b, c, such as an image, embedded another object, such as an HTML pages including the object. The diagnostic applet 14 then monitors (at block 60) the port providing the connection in the customer system 8 to the network 10 to monitor the progress of the object i being downloaded.

The term "performance time" with respect to objects refers to the time to download the object i. In this way, the performance time captures the network transmission time to download an object and system performance time in processing the transmitted data. Total performance time is impacted by both the network transmission time, which is affected by network factors and connection capabilities, server performance and load, and the client's 4 processing capabilities. After determining the download time for object i, the customer system 8 stores (at block 66) the measured performance time for object i, along with other information, such as the time and date the performance time was measured and the URL address of the object i. At block 68, the diagnostic applet 14 returns to block 56 to gather performance data for another object. After gathering all the data, the diagnostic applet 14 executing in the customer 8 would perform (at block 70) analysis and calculations on the gathered data to generate a performance data report to then upload (at block 72) to the help desk system 6.

Figure 3:
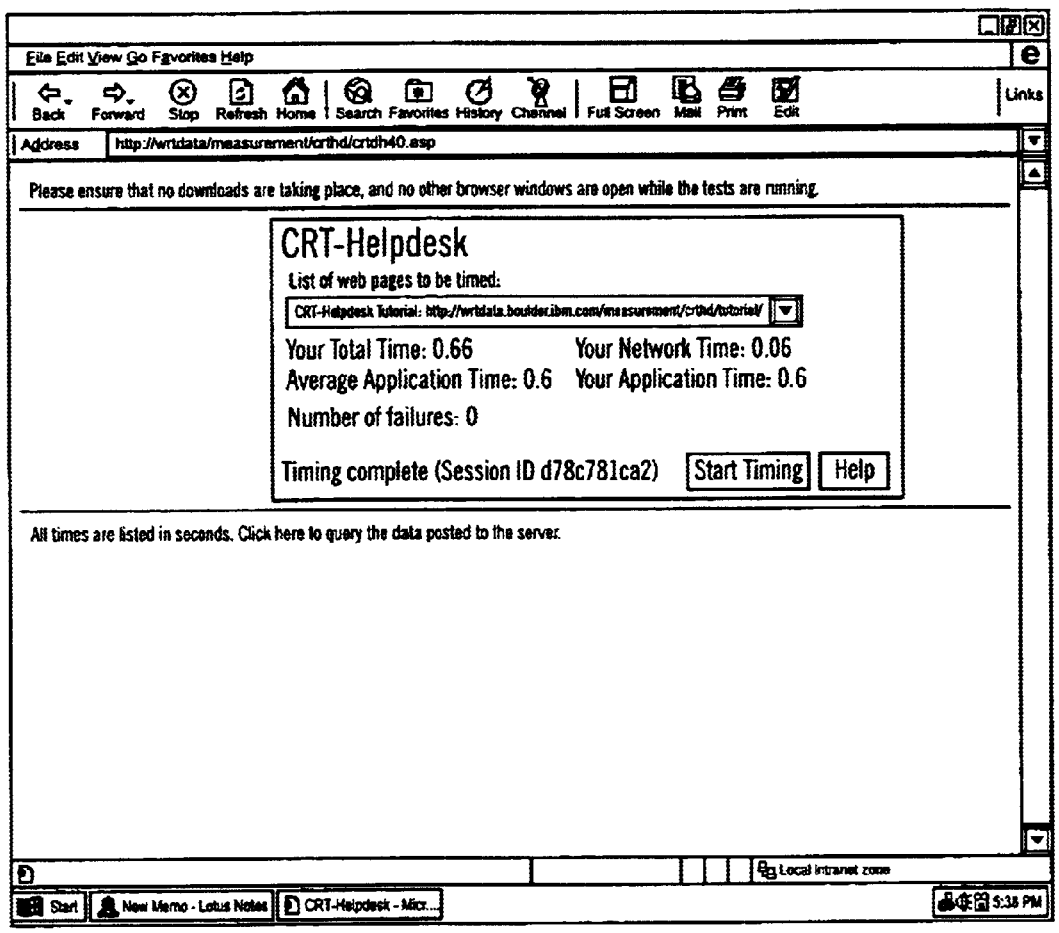
FIGS. 3 and 4 illustrates a display of performance data information gathered in accordance with preferred embodiments of the present invention.
Figure 4:
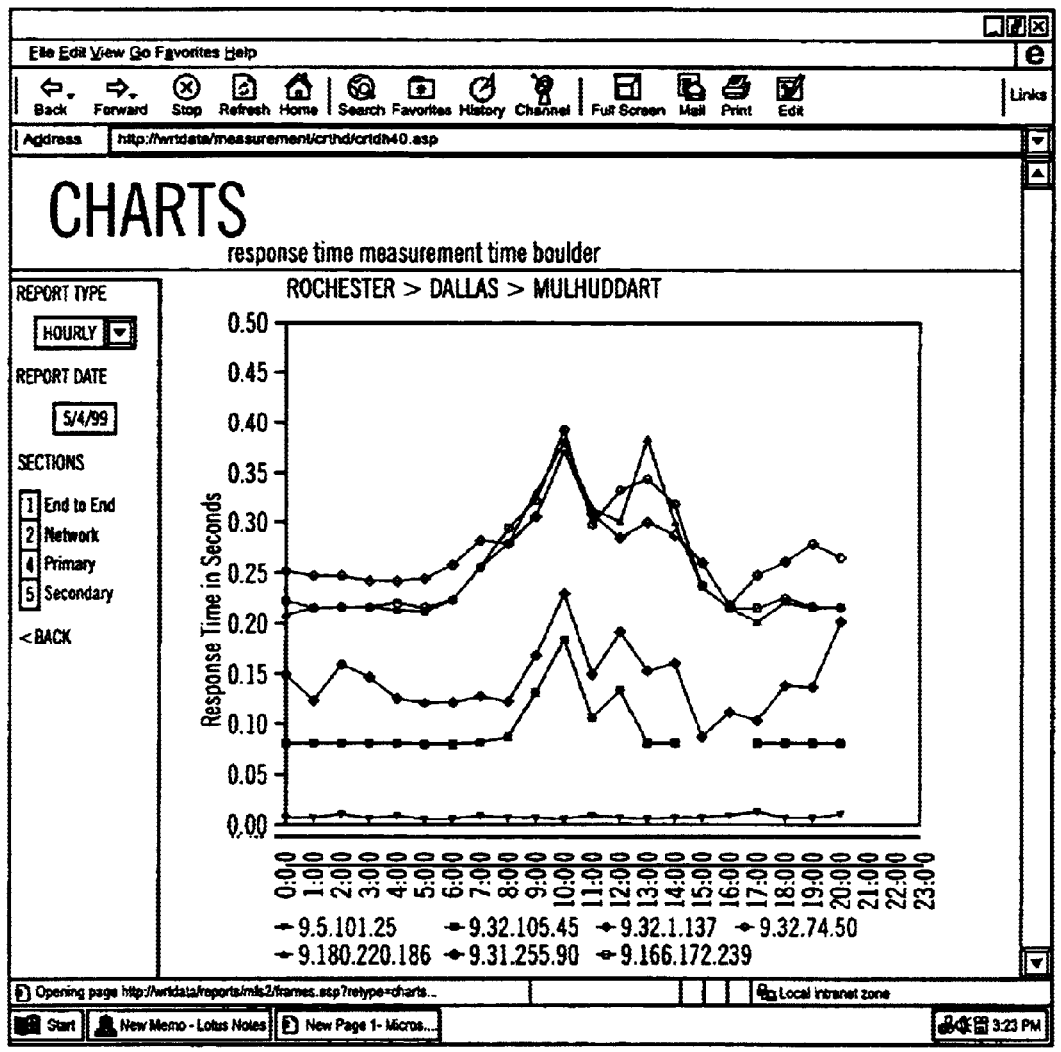

In preferred embodiments, the diagnostic applet 14 would display performance data on a monitor at the customer system 2. The diagnostic applet 14 could display the progress of downloading the objects at a URL to inform the customer about the current activity. After determining the performance times for all the objects, the diagnostic program 14 would then display on the customer system 8 monitor information on the performance times for each object, the URL of the object, time measurement occurred, etc. The help desk system 6 may then provide the diagnostic applet 14 over the network 10 information on average performances for the object in the network 10. This allows the customer to determine how the customer system 8 is performing with respect to other users and customers in the system. After gathering the data, the diagnostic applet 14 would transmit, via an FTP site, all the gathered data to the help desk system 6. The help desk system 6 would then store all customer performance information in the database 16. FIG. 3 illustrates an example of what the diagnostic applet 14 would display in the customer 6 browser 12, including the time to download for the customer and average network data. FIG. 4 illustrates data the diagnostic applet 14 would generate on response times at different hubs at different times of day.

In still further embodiments, additional historical data can be combined for trending. Still further, the customer system 8 can execute the applet at predetermined intervals automatically, such as in autopilot mode, to send the help desk 6 performance data over a period of time. The customer may be allowed to set the duration and number of times the applet is executed to generate performance data in this autopilot mode. This would allow the technician at the help desk 6 and/or the customer to determine trends in data, i.e., whether at certain periods network transmission improved.

Utilizing Performance Data During Diagnosis

As discussed, the diagnostic applet 16 gathers two components of the performance time to download objects 20a, b, c. One is network transmission time, which is dependent on the route used to download the information, i.e., number of hops, customer system 8 connection, i.e., modem, cable mode, T2, etc., and server 4 delay times. The download time the diagnostic applet 14 measures includes both the network transmission time and server delay time, individually and collectively.

Figure 5:
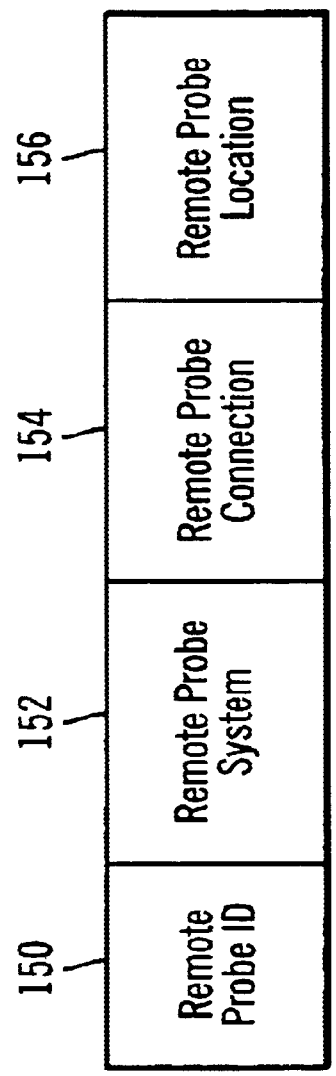
FIGS. 5 and 6 illustrate data records to store customer performance data in accordance with preferred embodiments of the present invention.
Figure 6:
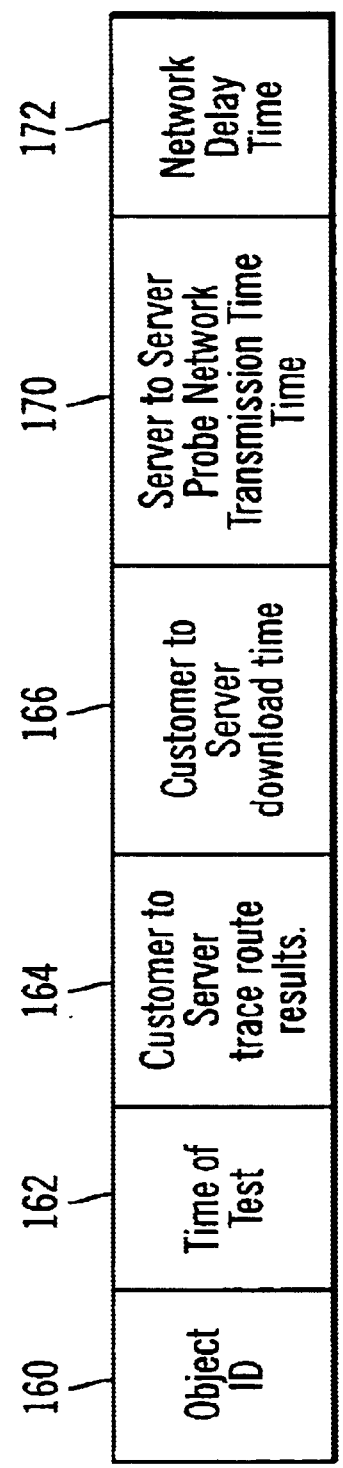

FIGS. 5 and 6 illustrates a preferred embodiment of data structures the help desk system 6 would use to group the performance data received from the diagnostic applet 14 into various fields. The grouped fields of data may be stored in the database 16. FIG. 5 illustrates the fields in a customer record to store information on a particular customer system 8. Each customer record would be associated with one or more of the performance test records, shown in FIG. 6, that maintain performance data gathered during each performance test.

With respect to FIG. 5, field 150 includes a customer system ID; field 152 indicates the hardware and operating system for the customer system 8; field 154 indicates the connection device included in the customer system 8, e.g., cable modem, telephone modem, T-1 line, etc.; and field 156 indicates the geographical location of the customer system 8.

The fields 160–172 in FIG. 6 comprise performance data record indicating performance times related to downloading object 20a, b, c. In preferred embodiments, there is an instance or record of fields 160–170 for each object 20a, b, c downloaded as part of a performance test at a particular customer system 8 identified in an associated customer record having fields 150–156. Thus, for each group of fields 150–156 that identify a customer system 8, there may be numerous associated performance tests, wherein each performance test is described in a record including fields 160–172.

Field 160 includes information on the object 20a, b, c subject to the performance test, including information on the object size; field 162 indicates the time and date of the performance test for the object 20a, b, c indicated in field 160; field 164 provides the trace route results to trace a packet from the server 4 to the customer system 8; field 166 includes the time to download the object from the server 4 to the customer system 8; field 170 includes the server 4 to server probe 18 network transmission time, which primarily reflects the delay time for the server 4 to process and return the requested object. The information in field 170 may only be maintained in the database 16 and not presented to the customer system 8. In such case, the performance information displayed by the diagnostic applet 14 at the customer system 8 may include only the download and display time. In such case, field 170 would be used primarily by the help desk system 6 when diagnosing customer problems. Field 172 indicates the network delay time calculated subtracting the estimated server 4 delay time in field 170 from the download time in field 166.

The network delay time in field 172 indicates a network transmission time that includes primarily network transmission delay factors to route a page through the network 10 and across the geographical distance between the server 4 and the customer system 8. For instance, transmission from the server 4 to the customer system 8 may involve the transmission of the file in multiple packets through multiple routers, i.e., hops. At the routers, the transmission may be routed to various intermediary routers before reaching the target location indicated by the IP address. Thus, the network delay time in field 172 indicates delays associated with routing the transmission packets through multiple routers between the server 4 and customer system 8, including the multiple routers, regional network traffic, and the router traffic management algorithms that affect transmissions. The performance time, indicated in field 172, for transmissions between the server 4 and server probe 18 is typically less than the download time indicated in field 166, because the transmission between the server 4 and physically proximate server probe 18 requires far fewer hops than the transmission between the customer system 8 and the server 4. In this way, by subtracting the performance time in field 170, delay times due primarily to server 4 factors are removed, such as server load, server traffic, and the server input/output processing capabilities.

Other techniques may be used to calculate the performance related values described above. For instance, during data gathering, instead of measuring the performance time between the customer system 8 and server 4, the performance time can be measured between the server probe 18 and customer system 8 by having the customer system 8 request and submit pages to the server probe 6 in the same manner the remote probe 8a, b, c, d would request and submit pages to the server 4. The logic of FIGS. 2 and 3 and may be used to gather performance time data for operations between the customer system 8 and server probe 18. Performance times between the server probe 18 and customer system 8 would reflect a network transmission time that does not incorporate load and traffic burdens on the server 4 as the server probe 18 does not experience the network traffic that the server 4 experiences. This would allow a technician to determine problems associated with the network 10 and customer system 8 in downloading documents, as any problems from server 4 load are removed from the performance data when downloading data from the server probe 18. Alternatively, to incorporate some, but not all, of the delays due to server load and traffic, the performance time between the server 4 and the customer system 8 in field 166 can be calculated by averaging the performance time between the customer system 8 and server probe 18 and customer system 8 and server 4. This will incorporate some aspect of server 4 load and traffic as such server load and traffic factors effect the real network transmission time customer systems 8 actually experience.

In further embodiments, if an error occurs while an object is being downloaded during execution of the diagnostic applet 14, the diagnostic applet could capture information about the error, such as determining the cause of the error or capturing a copy of a screen image displaying information on the error, and generate an e-mail including information on the error to transmit to the help desk system 6. In this way, the technician at the help desk system 6 is immediately informed of any errors that may provide useful information to diagnose the customer problems. Still further, after gathering the performance data, the diagnostic applet 14 could compare the gathered data against thresholds the applet maintains, i.e., download time thresholds. If the data gathered at the customer system 8 exceeds any of the thresholds, the diagnostic applet 14 could immediately build an e-mail to the help desk system 6 including information on the gathered performance data that exceeded the threshold to immediately inform the technician at the help desk system 4 of the problem.

As discussed, after the customer system 8 executes the diagnostic applet 14, the diagnostic applet 14 would display performance time data and average performance data across all customers, as shown in FIG. 3. Such average performance data across all customers can be obtained by performing SQL operations on the database 16. Further, when the customer system 8 uploads the gathered performance data to the help desk system 6, the help desk system 6 would form performance data records including the fields shown in FIG. 6, and store such records in the database 16 for the customer system 8.

After the customer system 8 runs the diagnostic applet 14 and transmits the gathered performance data to the help desk system 6, a technician at the help desk system 6 can then review the performance data to diagnose the problems with the customer system 8. Alternatively, the end user, customer, can perform self-diagnosis based upon the performance data and search an Internet web on-line help site to determine solutions and fixes for the diagnosed problem. For instance, if the network transmission time is a significant drag on performance and the trace route indicates that network 10 route for the customer system 8 to communicate with the server 4 is exceptionally long, then most of the performance problems may be due to distance, which is outside of the control of the customer. Further, if the trace route was not particularly long, then poor network performance could be due to the customer system 8 configuration, e.g., slow modem, slow processor to gather downloaded data.

With preferred embodiments a technician can have the customer system automatically execute the diagnostic applet 14 and immediately obtain performance data to better diagnose the cause of the problem. Moreover, the help desk system 6 may analyze performance data in the database 16 to compare the just obtained performance data with average customer performance data from the database 16 to identify problems in the network 10 path to the browser 12 application. Preferred embodiments allow the technician to perform diagnostic operations and obtain data without having to rely on the customer performing the operations under telephone instruction. In this way, the customer is relieved of having to perform the testing. Further, by having the diagnostic applet 14 perform diagnostic operations, problems due to customer error, such as inaccuracies in the findings, are eliminated. Moreover, the help desk system 6 may display the performance results along with other network 10 performance data to the technician to allow the technician to immediately review all relevant data, including relevant performance data just gathered and relevant statistics across all customers that can help the technician identify the reason for the performance problems at the customer system 8 being diagnosed.

The preferred diagnostic applet 14 will also substantially reduce the time a technician needs to spend with a customer to diagnose the problems because all the pertinent data is obtained automatically and relatively quickly from a program. This will reduce the cost of providing technical support. Moreover, by providing the customer immediate feedback of the performance test, the customer may better understand the causes of delays in retrieving information, which may be primarily due to factors outside of the server 4 operators control, such as the speed of the customer system 4 modem, processor, and software, and the distance of the customer system 8 from the server 4.

Alternative Embodiments and Conclusions

This, concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments the customer system 8 and server 4 were described as having particular configurations. However, in further embodiments the customer system 8 and server probe 18 may be comprised of any network client device and the server 4 may be comprised of any network server device.

Preferred embodiments were described with respect to customer systems, such as a customer that may access data from a remote system. However, the customer systems may comprise any user system, such as a user of network services, which may include employees or other persons.

Preferred embodiments of the data fields used to maintain performance data were described with respect to FIGS. 5 and 6. However, in alternative embodiments, additional data types may be added or data fields removed. Further, alternative arrangements and relations of the fields and performance data may be provided according to database management techniques known in the art, including relational database management techniques.

Preferred embodiments were described with respect to a customer. However, in further embodiments the end user receiving the diagnostic program from the server may be any end user, and not just a consumer of commercial computer or on-line products.

In preferred embodiments, the diagnostic applet 14 gathered information on network performance time, such as download time and application processing time. However, the diagnostic applet can be used to gather any type of performance data on the customer system that could be helpful to a technician attempting to diagnose the cause for the customer's dissatisfaction.

Preferred embodiments were described with respect to determining performance of downloading and displaying objects or files from a server. However, in alternative embodiments, the diagnostic applet may be use to gather performance information for customer operations unrelated to downloading files, such as the performance of particular software programs or hardware components running on the customer system. In this way, hardware and software vendors could run a diagnostic applet to gather performance data related to the operation of the vendor's software and hardware that the vendor could then use to diagnose the problems the customer is experiencing with the vendor software and hardware.

In preferred embodiments, the customer system 8 receives the diagnostic applet 14 when contacting a technician for assistance. In alternative embodiments, the diagnostic applet 14 may remain as a program within the customer system 8 that is executed to gather performance data. In such case, there is no need to have the customer system 8 download the applet 14 each time the customer requests diagnosis and assistance.

In summary, preferred embodiments disclose a method, system, and program for or diagnosing a computer over a network. A program is provided that executes on the computer. The program causes the computer to download at least one object from a server over the network. Performance data is determined with respect to downloading the object from the server to the computer over the network in order to diagnose performance problems with the computer. The determined performance data is then transmitted to a diagnostic system over the network.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for diagnosing a customer computer over a network, comprising:
    initiating a customer service session to provide technical support of a customer computer;
    transmitting a program to execute on the computer, wherein the program causes the customer computer to perform:
        (i) downloading at least one object from a server to the customer computer over the network;

(ii) determining performance data comprising a network transmission time to download the object from the server to the customer computer over the network to diagnose performance problems with the customer computer, wherein a diagnostic system stores the performance data as a record in a database;

(iii) displaying the determined performance data at the customer computer being diagnosed and average performance data determined from the database to provide information to diagnose the customer computer;

(iv) transmitting the determined performance data to the diagnostic system over the network;

determining a network transmission time for a probe computer that is in a proximate location with respect to the server to download the at least one object from the server;

using the network transmission time for the probe computer to determine a server load delay time and a network-only delay time which indicates time to download the at least one object from the server to the customer computer that does not include the server load delay; and using the performance data transmitted to the diagnostic system to provide technical support for the customer computer.

2. A computer system for diagnosing a customer computer over a network, comprising:

means for initiating a customer service session to provide technical support of the customer computer;

means for transmitting a program to execute on the customer computer, wherein the program causes the customer computer to perform:

(i) downloading at least one object from a server to the customer computer over the network;

(ii) determining performance data comprising a network transmission time to download the object from the server to the customer computer over the network to diagnose performance problems with the customer computer;

(iii) transmitting the determined performance data over the network; and (iv) displaying the determined performance data at the customer computer being diagnosed and average performance data determined from a database to provide information to diagnose the customer computer;

means for receiving the performance data transmitted from the customer computer;

means for storing the performance data as a record in the database;

means for determining a network transmission time for a probe computer that is in a proximate location with respect to the server to download the at least one object from the server;

means for using the network transmission time for the probe computer to determine a server load delay time and a network-only delay time which indicates time to download the at least one object from the server to the customer computer that does not include the server load delay; and means for using the performance data transmitted to the diagnostic system to provide technical support for the customer computer.

3. An article of manufacture for use in diagnosing a customer computer over a network, the article of manufacture comprising computer usable media including at least one computer program embedded therein that causes a diagnostic system to perform:

initiating a customer service session to provide technical support of a customer computer;

transmitting a diagnostic program to execute on the computer, wherein the program causes the customer computer to perform:

(i) downloading at least one object from a server to the customer computer over the network;

(ii) determining performance data comprising a network transmission time to download the object from the server to the customer computer over the network to diagnose performance problems with the customer computer;

(iii) transmitting the determined performance data to the diagnostic system over the network, wherein the diagnostic system stores the performance data as a record in a database; and (iv) displaying the determined performance data at the customer computer being diagnosed and average performance data determined from the database to provide information to diagnose the customer computer;

determining a network transmission time for a probe computer that is in a proximate location with respect to the server to download the at least one object from the server;

using the network transmission time for the probe computer to determine a server load delay time and a network-only delay time which indicates time to download the at least one object from the server to the customer computer that does not include the server load delay, and using the performance data transmitted to the diagnostic system to provide technical support for the customer computer.

4. A method for diagnosing a computer over a network, comprising:

providing a program to execute on the computer, wherein the program causes the computer to perform:

(i) downloading at least one object from a server to the computer over the network;

(ii) determining performance data comprising a network transmission time to download the object from the server to the computer over the network to diagnose performance problems with the computer;

(iii) transmitting the determined performance data to a diagnostic system over the network;

(iv) receiving network performance data indicating network performance with respect to other systems in the network; and (v) rendering information indicating the determined performance data and the received network performance data at the computer, determining a network transmission time for a probe computer that is in a proximate location with respect to the server to download the at least one object from the server; and using the network transmission time for the probe computer to determine a server load delay time and a network-only delay time which indicates time to download the at least one object from the server to the customer computer that does not include the server load delay.

5. The method of claim 4, wherein the diagnostic system stores the performance data as a record in a database.

6. The method of claim 5, wherein the diagnostic system displays the performance data from the computer being diagnosed and average performance data determined from the database at the server to provide information to diagnose the computer.

7. The method of claim 4, wherein the program causes the computer to further preform:

detecting a presence of a condition occurring as a result of downloading the at least one object from the server;

building an electronic message addressed to the diagnostic system including information on the detected condition;

transmitting the electronic message to the diagnostic system over the network.

8. The method of claim 4, wherein the performance data includes trace route data indicating a route packets comprising the object travel through the network when transmitted from the server to the customer computer.

9. The method of claim 4, wherein the program comprises an applet that executes within an Internet web browser program executing on the customer computer.

10. An article of manufacture for diagnosing a computer over a network, wherein the article of manufacture causes the computer to perform:

downloading at least one object from a server to the computer over the network;

determining performance data comprising a network transmission time to download the object from the server to the computer over the network to diagnose performance problems with the computer;

transmitting the determined performance data to a diagnostic system over the network;

receiving network performance data indicating network performance with respect to other systems in the network;

receiving a network transmission time for a probe computer that is in a proximate location with respect to the server to download the at least one object from the server, wherein the network transmission time for the probe computer is used to determine a server load delay time and a network-only delay time which indicates time to download the at least one object from the server to the customer computer that does not include the server load delay; and rendering information indicating the determined performance data and the received network performance data at the computer.

11. The article of manufacture of claim 10, wherein the diagnostic system stores the performance data as a record in a database.

12. The article of manufacture of claim 11, wherein the diagnostic program displays the performance from the customer computer being diagnosed and average performance data determined from the database at the server to provide information to diagnose the customer computer.

13. The article of manufacture of claim 10, wherein the diagnostic program causes the customer computer to further perform:

detecting a presence of a condition occurring as a result of downloading the at least one object from the server;

building an electronic message addressed to the diagnostic system including information on the detected condition;

transmitting the electronic message to the diagnostic system over the network.

14. The article of manufacture of claim 10, wherein the performance data includes trace route data indicating the route packets comprising the object travel through the network when transmitted from the server to the customer computer.

15. The article of manufacture of claim 10, wherein the diagnostic program comprises an applet that executes within an Internet web browser program executing on the customer computer.

16. A computer system for diagnosing a customer computer over a network, comprising:

means for providing a program to execute on the computer, wherein the program causes the computer to perform:

(i) downloading at least one object from a server to the computer over the network;

(ii) determining performance data comprising a network transmission time to download the object from the server to the computer over the network to diagnose performance problems with the computer;

(iii) transmitting the determined performance data to a diagnostic system over the network;

(iv) receiving network performance data indicating network performance with respect to other systems in the network; and (v) rendering information indicating the determined performance data and the received network performance data at the computer;

means for determining a network transmission time for a probe computer that is in a proximate location with respect to the server to download the at least one object from the server; and means for using the network transmission time for the probe computer to determine a server load delay time and a network-only delay time which indicates time to download the at least one object from the server to the customer computer that does not include the server load delay.

17. The system of claim 16, further comprising means for storing the performance data as a record in a database.

18. The system of claim 17, further comprising means for displaying the performance data from the customer computer being diagnosed and average performance data determined from the database to provide information to diagnose the customer computer.

19. The system of claim 16, wherein the program causes the customer computer to further perform:

detecting a presence of a condition occurring as a result of downloading the at least one object from the server;

building an electronic message addressed to the computer system including information on the detected condition;

transmitting the electronic message to the computer system over the network.

20. The system of claim 16, wherein the performance data includes trace route data indicating a route packets comprising the object travel through the network when transmitted from the server to the customer computer.

21. The system of claim 16, wherein the program comprises an applet that executes within an Internet web browser program executing on the customer computer.

* * * * *